(12) United States Patent
Johannessen (10) Patent No.: US 12,382,564 B2
(45) Date of Patent: Aug. 5, 2025

(54) SYSTEM AND METHOD FOR A CIRCADIAN SPECTRAL WEIGHTING MODE

(71) Applicant: B/E Aerospace, Inc., Winston Salem, NC (US)

(72) Inventor: Eric Johannessen, Holbrook, NY (US)

(73) Assignee: B/E Aerospace, Inc., Winston-Salem, NC (US)

( * ) Notice: Subject to any disclaimer, the term of this patent is extended or adjusted under 35 U.S.C. 154(b) by 194 days.

(21) Appl. No.: 18/098,844

(22) Filed: Jan. 19, 2023

(65) Prior Publication Data

US 2024/0251493 A1    Jul. 25, 2024

(51) Int. Cl.
| | |
|---|---|
| *H05B 47/105* | (2020.01) |
| *B64D 11/00* | (2006.01) |
| *F21V 23/00* | (2015.01) |
| *H05B 45/20* | (2020.01) |
| *H05B 47/155* | (2020.01) |
| *F21Y 115/10* | (2016.01) |

(52) U.S. Cl.
CPC ........... *H05B 47/105* (2020.01); *B64D 11/00* (2013.01); *F21V 23/003* (2013.01); *H05B 45/20* (2020.01); *B64D 2011/0038* (2013.01); *B64D 2011/0053* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 7,896,530 B2 | 3/2011 | Budinger et al. | |
| 9,493,112 B2 | 11/2016 | Thomas et al. | |
| 10,202,194 B2 | 2/2019 | Beckman | |
| 2022/0001200 A1* | 1/2022 | Petluri | H05B 47/115 |

FOREIGN PATENT DOCUMENTS

| | | | | |
|---|---|---|---|---|
| WO | 2021228671 | | 11/2021 | |
| WO | WO-2021228671 A1 * | | 11/2021 | ........... A61N 5/0618 |

OTHER PUBLICATIONS

European Patent Office, European Search Report dated May 13, 2024 in Application No. 23212306.7.

* cited by examiner

*Primary Examiner* — Anh Q Tran
(74) *Attorney, Agent, or Firm* — SNELL & WILMER L.L.P.

(57) ABSTRACT

A method and system may include commanding, by a processor, a lighting system to generate a desired melanopic effect in accordance with a spectral weighting mode. To determine, by the processor, the spectral weighting mode based on an algorithm that compares a part of a spectrum for an amount of melanopic lumen to a melanopic sensitivity curve to generate a result comprising a melanopic ratio. In response to the result comprising the melanopic ratio, to by determine by the processor a visual brightness by calculations using an algorithmic solution based on the melanopic ratio multiplied by an amount of color temperature generating the visual brightness in accordance with the spectral weighting mode of the desired melanopic effect.

18 Claims, 7 Drawing Sheets
(4 of 7 Drawing Sheet(s) Filed in Color)

SYSTEM AND METHOD FOR A CIRCADIAN SPECTRAL WEIGHTING MODE

FIELD

The present disclosure relates generally to lighting systems and methods and, more particularly, to varying lighting system outputs based on various parameters to generate a melanopic response in aircraft interiors.

BACKGROUND

Advanced full-cabin lighting system can be attuned to human biology to reduce passenger jetlag, and color-optimized to improve the appearance of materials, food and fixtures throughout the cabin. The lighting can be autonomized to intelligently synchronize with real-time flight data to enable predictive and independent functionality.

Advances in light emitting diode ("LED") technology has made LEDs an ideal source of light where low-powered lighting solutions are desirable, such as in an aircraft, where power availability is limited. Recently, new technologies have become available with the potential to enhance the usefulness of LEDs generally, but which have not been fully realized in aircraft lighting.

SUMMARY

An article of manufacture is disclosed herein. The article of manufacture includes a tangible, non-transitory computer-readable storage medium having instructions stored thereon that, in response to execution by a processor, cause the processor to perform operations comprising: command, by the processor, a lighting system to generate a desired melanopic effect in accordance with a spectral weighting mode; determine, by the processor, the spectral weighting mode based on an algorithm that compares a part of a spectrum for an amount of melanopic lumen to a melanopic sensitivity curve to generate a result comprising a melanopic ratio; and in response to the result comprising the melanopic ratio, determine a visual brightness by calculations using an algorithmic solution based on the melanopic ratio multiplied by an amount of color temperature generating the visual brightness in accordance with the spectral weighting mode of the desired melanopic effect.

In various embodiments, the color temperature comprises a white color temperature.

In various embodiments, the white color temperature is in a range between 2000 Kelvins to 8000 Kelvins.

In various embodiments, the color temperature is optimized for a range between 4000 Kelvins to 6000 Kelvins.

In various embodiments, the white color temperature for the desired melanopic effect comprises a melanopic mode of a maximum amount that is produced by the spectral weighting mode comprising a cyan color set at a maximum percentage with a color temperature mixture comprising at least a set of a first, second and third color temperature.

In various embodiments, the white color temperature for the melanopic mode at the maximum amount is produced by the spectral weighting mode of a cyan color that is set at approximately one-hundred percent with an added color mixture comprising at least a first, second and third color.

In various embodiments, a lighting system is disclosed. The lighting system includes a plurality of light emitting diodes (LEDs); and a controller in operable communication with the plurality of LEDs, the controller configured to cause the plurality of LEDs to transition to a spectral weighting mode to: generate a desired melanopic effect in accordance with the spectral weighting mode; determine the spectral weighting mode based on an algorithm that compares a part of a spectrum for an amount of melanopic lumen to a melanopic sensitivity curve to generate a result comprising a melanopic ratio; and in response to the result comprising the melanopic ratio, determine a visual brightness by calculations using an algorithmic solution based on the melanopic ratio multiplied by an amount of color temperature generating the visual brightness in accordance with the spectral weighting mode of the desired effect.

In various embodiments, the plurality of LEDs comprise at least five LEDs.

In various embodiments, the plurality of LEDs comprise at least six LEDs.

In various embodiments, the plurality of LEDs comprises at least one LED configured to emit electromagnetic radiation having a wavelength of between 490 nm and 510 nm to generate a cyan color.

In various embodiments, the color temperature comprises a white color temperature.

In various embodiments, the white color temperature is in a range between 2000 Kelvins to 8000 Kelvins.

In various embodiments, the color temperature is optimized for a range between 4000 Kelvins to 6000 Kelvins.

In various embodiments, each LED in the plurality of LEDs is configured to emit the electromagnetic radiation of a different wavelength.

In various embodiments, the white color temperature for the desired effect comprising a melanopic mode of a maximum amount that is produced by the spectral weighting mode comprising a cyan color set at a maximum percentage with a color temperature mixture comprising at least a set of a first, second and third color temperature.

In various embodiments, the white color temperature for the melanopic mode at the maximum amount is produced by the spectral weighting mode of a cyan color that is set at approximately one-hundred percent with an added color mixture comprising at least a first, second and third color.

In various embodiments, a light assembly for an aircraft cabin is disclosed. The light assembly includes a controller in operable communication with a light unit, the controller configured to: apply a lighting condition using the light unit comprising a melanopic sensitivity in accordance with a spectral weighting mode; determine the spectral weighting mode based on an algorithm that compares a part of a spectrum for an amount of melanopic lumen to a melanopic sensitivity curve to generate a result comprising a melanopic ratio; and in response to the result comprising the melanopic ratio, determine a visual brightness to operate the light unit by calculations using an algorithmic solution based on the melanopic ratio multiplied by an amount of color temperature generating the visual brightness in accordance with the spectral weighting mode of the desired effect.

In various embodiments, the color temperature comprises a white color temperature in a range between 2000 Kelvins to 8000 Kelvins.

In various embodiments, the white color temperature for the desired effect comprising a melanopic mode of a maximum amount that is produced by a spectral weighting mode comprising a cyan color set at a maximum percentage with a color temperature mixture comprising at least a set of a first, second and third color temperature.

In various embodiments, the white color temperature for the melanopic mode at the maximum amount is produced by the spectral weighting mode with a cyan color that is set at approximately one-hundred percent with an added color mixture comprising at least a first, second and third color.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

By increasing the number and different wavelengths that can be produced by a plurality of colored LEDs used in traditional lighting systems, the hyper-gamut or extended or widest color gamut creates an improved lighting environment that harmonizes with a passenger's circadian rhythms, helping regulate the body's release of melatonin so travelers relax and fall asleep easier, even with the lights on. The enriched spectrum of light also helps the body awaken more naturally, minimizing the effects of jetlag upon arrival without altering the color, hue or quality of the light. In various embodiments, the hyper-gamut's high-efficiency LED system uses less power than legacy lighting systems, improving operational performance for carriers.

In various embodiments, the hyper-gamut can be used in a lighting system with intelligent connectivity system that synchronizes with in-flight data generated by the aircraft. The real-time flightpath, timing, weather conditions and global positioning information from the aircraft is collected and intelligently interpreted by processors of the lighting system to enable predictive functionality and autonomous operation of one or more spectral frequency modes to produce a desired melanopic response to reduce flight fatigue and improve the flight experience.

In various embodiments, the use of a hyper-gamut with an intelligent algorithm enables a plurality of LEDs configured in the lighting system to provide a wide color gamut enabling a passenger experience of saturated colors with a Color Rendering Index performance of >98 out of 100.

Disclosed herein are systems and methods to apply multiple light emitting diodes (LEDs) (e.g., quantum dots ("QDOTs"), organic LEDs (OLEDs), or any other LED) in a way that a spectral content achieves metamers/colors that are optimized for predefined operating modes.

In various embodiments, an improved lighting assembly disclosed herein comprises five or more LEDs. In various embodiments, by utilizing at least five LEDs, a color gamut may be expanded, providing various degrees of freedom to mix colors. In various embodiments, the systems, methods, and assemblies disclosed herein may be configured to facilitate optimization of lighting based on color rendering index (CRI), output, circadian manipulation, gamut area optimization, or the like.

In various embodiments, a control system for lighting optimization is disclosed herein. In various embodiments, the control system is configured to transition between various spectral weighting modes. The reference to "Spectral weighting modes," includes various "modes" of lighting display configured to generate a desired effect by optimizing a predetermined variable (e.g., hyper gamut, CRI, brightness, lumens, etc.) within a predetermined domain (e.g., chromacity coordinates (x,y), color temperature (Kelvin), brightness (%), etc.).

The "Color brightness" as disclosed herein is a measurement of how much light (i.e., white light) is seen in a color. For example, a color having 100% brightness would have full light and appear as white, whereas a color having 0% brightness would have no light and appear as black.

The "Color brightness" as disclosed herein is composed of two distinct characteristics, namely luminous flux (i.e., light emitted per second in a unit solid angle of one steradian from a uniform source of one candela measured in lumens) and color temperature (i.e., the color of the light produced by a respective bulb). For example, the higher the color temperature, the cooler light gets, and the lower the color temperature, the warmer light gets. In various embodiments, a warm color temperature as disclosed herein may be between 2000 K and 3500 K, a cool color temperature may be between 5000 K and 8000 K, and a full spectrum of color temperatures may be between 2000 K and 8000 K.

The "Color rendering index (CRI)," as disclosed herein refers to a quantitative measure of the ability of a light source to reveal the colors of various objects faithfully in comparison with an ideal or natural source. Light sources with a high CRI may be desirable in color critical applications, such as neonatal care, eating or the like. CRI is measured in accordance with International Commission on Illumination (CIE) Ra index, which ranges from 0 to 100.

"Metamers" as disclosed herein refers to color stimuli with different spectral radiant power distributions but are perceived as identical for a given observer.

Figure 1:
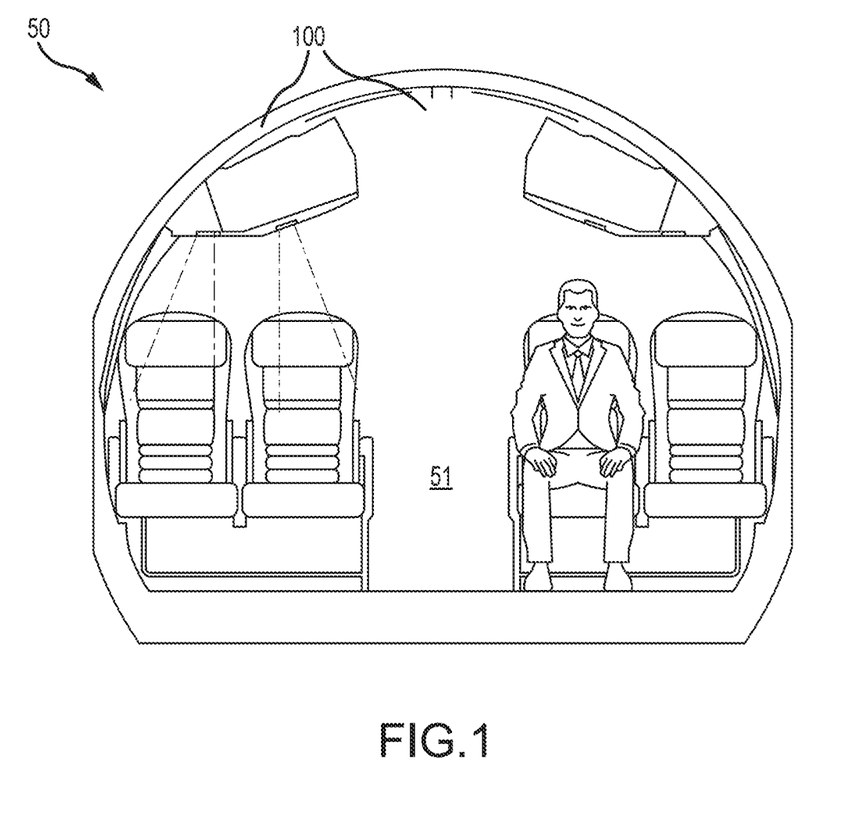
FIG. 1 illustrates an aircraft cabin, in accordance with various embodiments.

Referring to FIG. 1, a cabin 51 of an aircraft 50 is shown, according to various embodiments. The aircraft 50 may be any aircraft such as an airplane, a helicopter, or any other aircraft. The aircraft 50 may include various lighting systems 100 that emit visible light to the cabin 51. In various embodiments, a plurality of spectral weighting modes may be provided, controlled, and switched between for a lighting system 100, enhancing a cabin feel/experience, in accordance with various flight phases. The lighting systems 100 may be broken down into different addressable lighting regions that could be used on an aircraft. For example, the regions on an aircraft may include sidewall lighting, cross-bin lighting, over wing exit lighting, ceiling lighting, direct lighting, flex lights, reading lights, dome lights, lavatory lights, mirror lights, cockpit lights, cargo lights, etc. The regional breakdown of the lighting system allows lighting control over broad areas of the aircraft.

Figure 2:
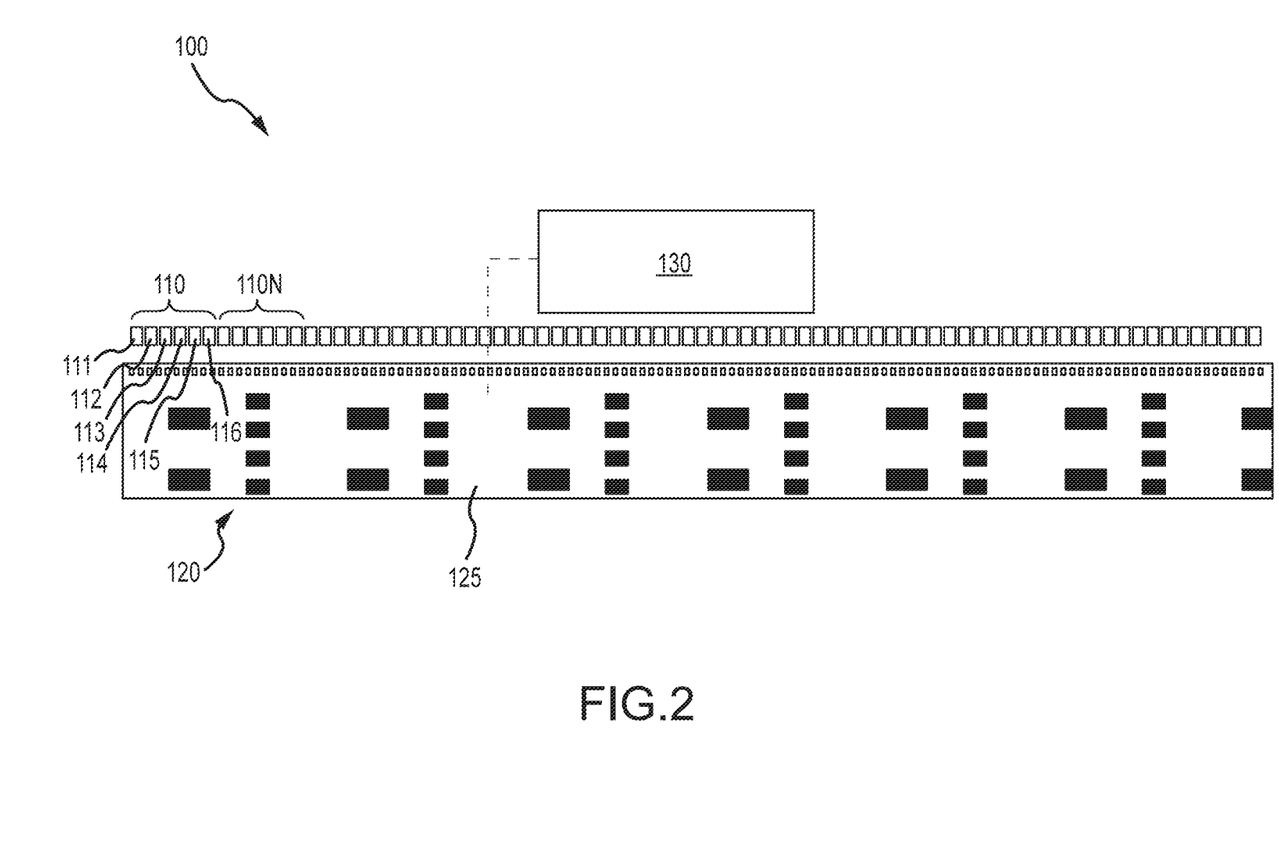
FIG. 2 illustrates a perspective view of a light system including at least one lighting unit, circuitry, and a controller, in accordance with various embodiments.

In various embodiments, and referring to FIG. 2, a lighting system 100 is provided. The lighting system 100 may be one or more of the lighting systems 100 of the aircraft 50 from FIG. 1. The lighting system 100 generally includes a lighting unit 110, circuitry 120, and a controller 130, according to various embodiments. The lighting unit 110, according to various embodiments, includes a plurality of light-emitting diodes ("LEDs"), each LED in the plurality of LEDs configured to emit electromagnetic radiation in a predetermined wavelength. Additional details pertaining to the lighting unit 110, the circuitry 120, and the controller 130 are provided below.

In various embodiments, the lighting unit 110 comprises an array of discrete LEDs controlled to blend their respective radiations to collectively produce a desired color quality, color saturation, and color brightness of electromagnetic radiation. In various embodiments, the lighting unit 110 can be configured to transition between various spectral weighting modes, which are configured to generate a desired effect by optimizing a predetermined variable (e.g., hyper gamut, CRI, brightness, lumens, etc.) within a predetermined domain (e.g., chromacity coordinates (x,y), color temperature (Kelvin), brightness (%), etc.).

In various embodiments, the lighting unit 110 can include a first LED 111 configured to emit first electromagnetic radiation having a first wavelength of between about 630 nanometers ("nm") and about 740 nm (e.g., red light), a second LED 112 configured to emit second electromagnetic radiation having a second wavelength of between about 580 nm and about 630 nm (e.g., amber light), a third LED 113 configured to emit third electromagnetic radiation having a third wavelength between about 540 nm and about 580 nm (e.g., a lime), a fourth LED 114 configured to emit a fourth electromagnetic radiation having a fourth wavelength between about 510 nm and about 540 nm (e.g., green), a fifth LED 115 configured to emit a fifth electromagnetic radiation having a fifth wavelength between about 490 nm and 510 nm (e.g., cyan), and/or a sixth wavelength between about 405 nm and about 490 nm (e.g., blue).

In various embodiments, the lighting unit 110 can include more, or less than these six LEDs. For example, the lighting unit may include 5, 6, 7, or 8 LEDs, and these additional LEDs may be other colors, such as amber, cyan, etc. For example, a lighting unit having a (red, green, blue, white) configuration, (a red, green blue, ultraviolet, white configuration), a (white, white, blue configuration), a (white, white) configuration, etc. are within the scope of this disclosure.

With continued reference to FIG. 2, the circuitry 120 of the lighting system 100 may include a circuit board 125 and may generally include various integrated circuit components which may carry out a variety of functions under the control of the controller 130. In various embodiments, the combination of the lighting unit 110 and the circuitry 120 is referred to as a lighting assembly, and the lighting assembly is configured to be driven/controlled by the controller 130, as described in greater detail below.

The particular implementations shown and described herein are illustrative examples of an LED lighting assembly, and are thus not intended to otherwise limit the present disclosure. For the sake of brevity, conventional electronics other components of the circuitry (such as power supplies and power modulators) may not be described in detail. The circuitry 120 is electrically coupled to the lighting unit 110 to supply respective driving signals to each of the LEDs 111, 112, 113, 114, 115, 116. In various embodiments, the lighting unit 110 may include additional LEDs, such as a white LED. In various embodiments, the lighting unit consists of only the six LEDs 111, 112, 113, 114, 115, 116 described above, and thus may not include other LEDs. In various embodiments, the lighting unit consists of only five LEDs. The lighting unit 110 may be replicated/repeated along a strip of circuit board 125. In various embodiments, the lighting unit 110 may include a diffuser lens (or diffuser lenses) covering the LEDs 111, 112, 113, and these lens(es) may comprise a glass material, a polymethyl methacrylate material, polycarbonate, and/or a polyamide material, among others.

In various embodiments, referring to FIG. 2, the controller 130 of the lighting system 100 may be affixed/integrated into the circuitry 120 or the controller 130 may be integrated into computer systems onboard an aircraft. In various embodiments, the controller 130 comprises a processor. In various embodiments, the controller 130 is implemented in a single processor. In various embodiments, the controller 130 may be implemented as and may include one or more processors and/or one or more tangible, non-transitory memories and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The controller 130 may comprise a processor configured to implement various logical operations in response to execution of instructions, for example, instructions stored on a non-transitory, tangible, computer-readable medium (i.e., the memory) configured to communicate with the controller 130. Any number of conventional techniques for electronics configuration, signal processing and/or control, data processing and the like may be employed. Also, the processes, functions, and instructions may can include software routines with processors, etc.

In various embodiments, the lighting system 100 disclosed facilitates application of spectral weighting modes. The "spectral weighting mode" is customizable and adaptable to achieve a CRI with levels of melanopic sensitivity effect by optimizing a predetermined variable (e.g., hyper gamut, CRI, brightness, lumens, etc.) within a predetermined domain (e.g., chromacity coordinates (x,y), color temperature (Kelvin), brightness (%), etc.). Efficacy Optimized Spectral Weighting Mode In various embodiments, the controller 130 can be programmed based on flight management data received from various avionic systems to configure a plurality of melanopic levels for desired effects associated with flight phases. For example, during an on boarding or arrival flight phase, the controller 130 can determine via an algorithm a desired melanopic effect under a spectral weighting mode. In various embodiments, the controller 130 can implement a spectral weighting mode based on comparisons of a part of a spectrum for an amount of melanopic lumen to a melanopic sensitivity curve to generate a result associated with a melanopic ratio.

In various embodiments, the controller 130 is configured to receive data of the melanopic ratio, and implement an algorithm to determine a visual brightness that calculates based on melanopic ratio multiplied by an amount of color temperature the level of visual brightness for a particular spectral weighting mode that generates the desired melanopic effect.

Figure 3:
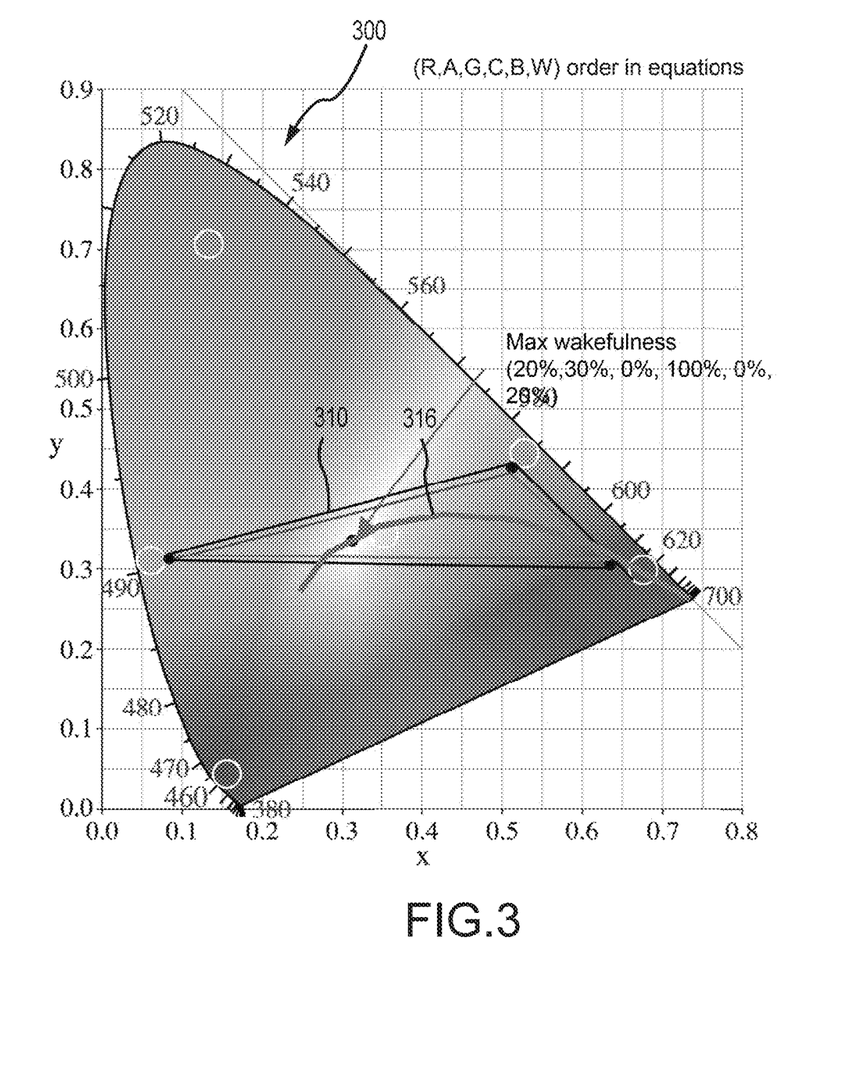
FIG. 3 is a color space chromaticity diagram from the International Commission on Illumination ("CIE"), commonly referred to as a CIE 1931 system diagram, showing various triangular color gamuts, in accordance with various embodiments.

In various embodiments, and referring to FIG. 3, a color space chromaticity diagram from the International Commission on Illumination ("CIE"), is illustrated that defines a bounded chromatic region with a color gamut configured for melanopic sensitivity in accordance with various embodiments.

In FIG. 3, there is shown a color space chromaticity diagram 300 ("diagram") that illustrates a color gamut for a plurality of full gamut spectral weighting mode that can be implemented.

In various embodiments, the full gamut spectral weighting mode for a white metamer with a high melanopic mix is shown for the chromatic bounded domain in diagram 300 that enables optimizing a color saturation within a range of chromacity coordinates (e.g., x, y coordinates). The "full gamut spectral weighting mode," of the lighting system 100 may be configured to create any color and optimize for color saturation regardless of color quality via mixing various LEDs of the lighting unit 110. If the desired color is within the hyper-gamut of FIG. 3, the color saturation will be 100%, and if the desired color is outside of the hyper gamut, the color saturation will be reduced towards a chromatic white.

In various embodiments, the CRI Spectral Weighting Mode comprises a "CRI optimized spectral weighting mode" which is optimized for CRI. The CRI optimized spectral weighting mode may achieve a desired effect of producing natural, or apparently natural white light. The CRI optimized spectral weighting mode could be used for configured during a boarding or arrival of an aircraft or the like. The CRI optimized spectral weighting mode may include a range to achieve an acceptable CRI (e.g., 95-100), which may be selected from within a range defined along the Planckian locus 316 from FIG. 3. A color temperature (Kelvin) may be selected based on a desired effect (e.g., 2700 Kelvin for warm light, which may be similar to an incandescent bulb).

In various embodiments, an "R9 optimized spectral weighting mode" can be implemented by the controller and includes optimizing for R9. "R9" as referred to herein represents how accurately a light source will reproduce strong red colors. In various embodiments, R9 is similar to CRI optimized except that R9 is given greater weight relative to CRI in color temperature determination. Upon selecting a color temperature in a manner similar to the CRI spectral weighting mode, a maximum R9 may be determined, followed by determining a maximum CRI corresponding to the maximum R9. In various embodiments, the color temperature range for the R9 spectral weighting mode may be between 2,000 K and 4,000 K. In this regard, R9 optimized may focus on red and warmer colors for the desired effect, in accordance with various embodiments.

The color gamut of diagram 300 shows an improved color hyper-gamut or hyper-gamut that is generated by a plurality of LEDs of the lighting system 100 disclosed. In various embodiments, a preferred spectral weighting mode is configured in a chromatic bounded domain 310 for the lighting system 100 to optimize a desired effect for a plurality of color mixes to achieve maximum or higher levels of melanopic sensitivity for different levels of white color temperature (Planckian locus 316). A white color temperature is set at approximately 4000 K for a sample. By applying the melanopic ratio on the luminous flux of the LED, the Equivalent Melanopic Flux (EML) in lumen is determined. The spectral weighting mode creates the proper mix for a low or high melanopic response. As the mode transitions between low and high melanopic responses, the algorithm is configured to determine the transition into a night mode (low melanopic), day mode (high melanopic) over particular time periods in advance to induce sleep or wakefulness. The brightness of the LEDS of the lighting system 100 is independent parameter and different color mixes can be achieved without affecting melanopic mix. For example, the lighting system 100 can configure a dimmer mode that may be a slightly dimmer scene of warm white but still have high melanopic mix to keep a passenger awake.

The controller 130 (in FIG. 2) is configured via an algorithm to multiply the Exposure value (Ev) and Melanopic Ratio (MR) to get the EML value. The formula is EML=Ev*MR. The melanopic ratio enables a desired light effect to be obtained with different lighting environment that achieve certain EML values.

In various embodiments, the controller 130 is configured to compensate for increases in the melanopic ratio by changing cyan brightness color wavelength which enables keeping the luminous flux of LED at a color temperature of 4000 k. A mixture of color temperatures is balanced by a selection of suitable LEDs via a phosphor formula that balances the luminous efficacy and melanopic ratio.

In various embodiments, the optimized spectral weighting mode may achieve a desired effect of producing a melanopic mode using natural, or apparently natural white light. The optimized or target Color Rendering Index (CRI) for a spectral weighting mode is varied for different flight segments. For example, a particular spectral weighting mode can be applied for a certain visual brightness when boarding the aircraft or the like.

The CRI optimized spectral weighting mode may include a range for an acceptable CRI (e.g., 95-100), which may be selected from within a range defined by the Planckian locus 316 from FIG. 3. A color temperature (Kelvin) may be selected based on a desired effect (e.g., 4000 Kelvin for visual brightness, which may be similar to an incandescent bulb).

For any color temperature ("color of light") from temperatures of about 2000 k to 8000 k generated by the lighting system 100, the preferred color temperature range is or likely exists for a warm light to cool light or desired brightness between the temperatures of 4000K and 6000K. The green and blue color brightness are not mixed or added when simulating the maximum melanopic mode as the resultant cyan color from the green/blue color mixture has wavelengths not within the chromatic bounded domain 310 that produce melanopic sensitivity within a preferred melanopic spectrum. In various embodiments, the cyan brightness color (generated from a cyan LED) is set to a maximum level or to one-hundred percent with added in color brightness from other color mixtures from the plurality of LEDs of the lighting system are added in. For example, some white color may be added to achieve the target CRI. To generate a specific color, the algorithm will configure an appropriate mix while maximizing/minimizing amounts of cyan. The intensity of for other LEDs of the lighting system can all be set at different levels. For example, a cool white brightness may not have mixed in much red color brightness from a red LED else it may cause a warm or warmer white color temperature. In various embodiments, a maximum brightness can be achieved when the level of brightness of a brightest LED of the lighting system is maximized.

Figure 4A:
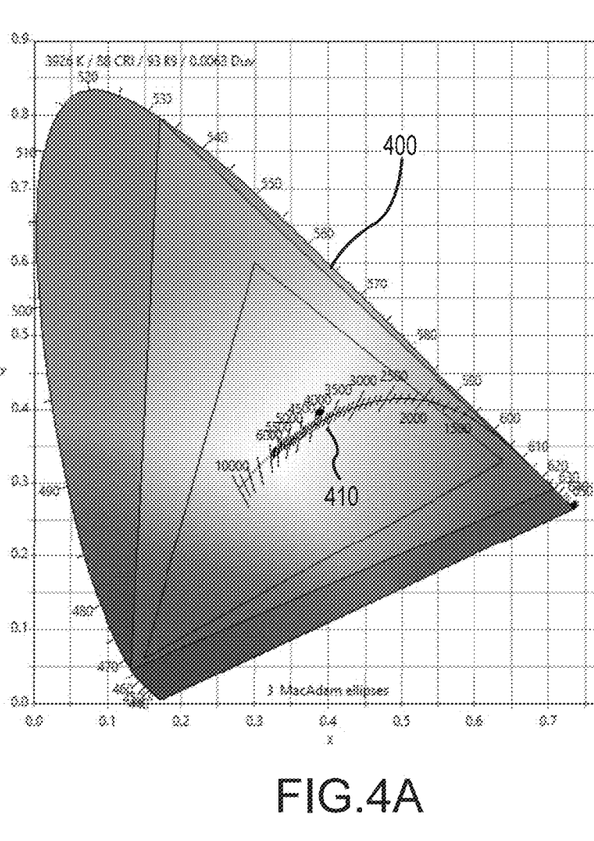
FIG. 4A illustrates a diagram of a maximum melanopic level with various white color temperatures in a color space chromaticity diagram from the International Commission on Illumination ("CIE") in accordance with various embodiments.

FIG. 4A illustrates a diagram of a maximum melanopic level with various white color temperatures in a color space chromaticity diagram from the International Commission on Illumination ("CIE") in accordance with various embodiments. The "maximum melanopic optimized spectral weighting mode" may be optimized for peak wakefulness, in accordance with various embodiments. In various embodiments, the diagram 400 maximum melanopic levels with a plurality of temperatures 410 that achieve a high 88CRI and 93R9 with a melanopic ratio of about 0.856. When the total lumens or brightness available is 100 percent more (or above 50%) than the melanopic lumens measures are about 85.6% (or high effect of the resultant from a high melanopic ratio) with a high circadian melatonin suppression. If the total lumens is less than 50% and hence there is not enough brightness, there is not enough energy from the cyan color even with a high melanopic ration to cause a high circadian melanin suppression.

In various embodiments, when cyan is maximized in white light, melatonin is suppressed (e.g., during daytime) and when there is a lack of cyan, a human body produces melatonin. The maximum melanopic optimized spectral weighting mode configured by the controller 130 (of FIG. 2) may maximize cyan in a mix that creates white light within the color temperature domain (e.g., between 2000 K and 8000 K). The maximum melanopic spectral weighting mode may achieve a desired effect of peak wakefulness (e.g., during a morning flight or the like).

Figure 4B:
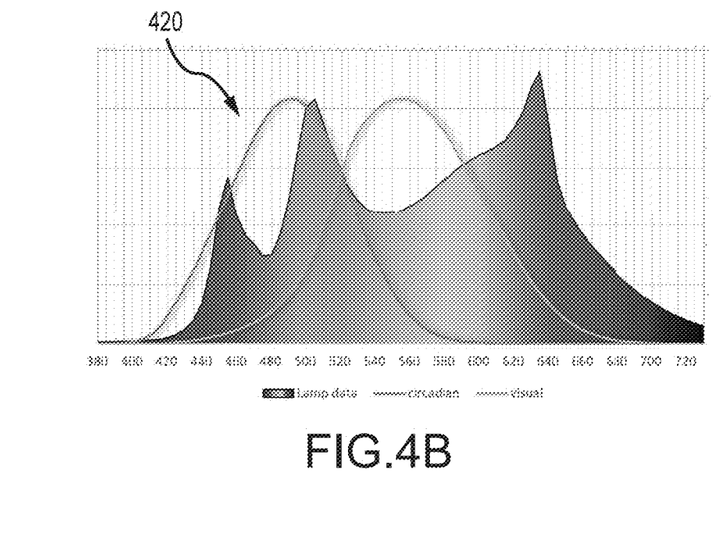
FIG. 4B illustrates a diagram of set of spectrums of comparisons for the LED, circadian and visual brightness in accordance with various embodiments.

FIG. 4B illustrates a set of spectrums for the LED, circadian and visual brightness in accordance with various embodiments. In the diagram 420, an exemplary 4000 k white color temperature lux is set with a high 88CR and 93R8 using a melanopic ratio of 856. The total lumens is 100 more than the melanopic lumens measures 85.6 with a high circadian melatonin suppression and a plurality of different color temperature mixes are compared to circadian levels with visual brightness in the diagram 420.

Figure 5:
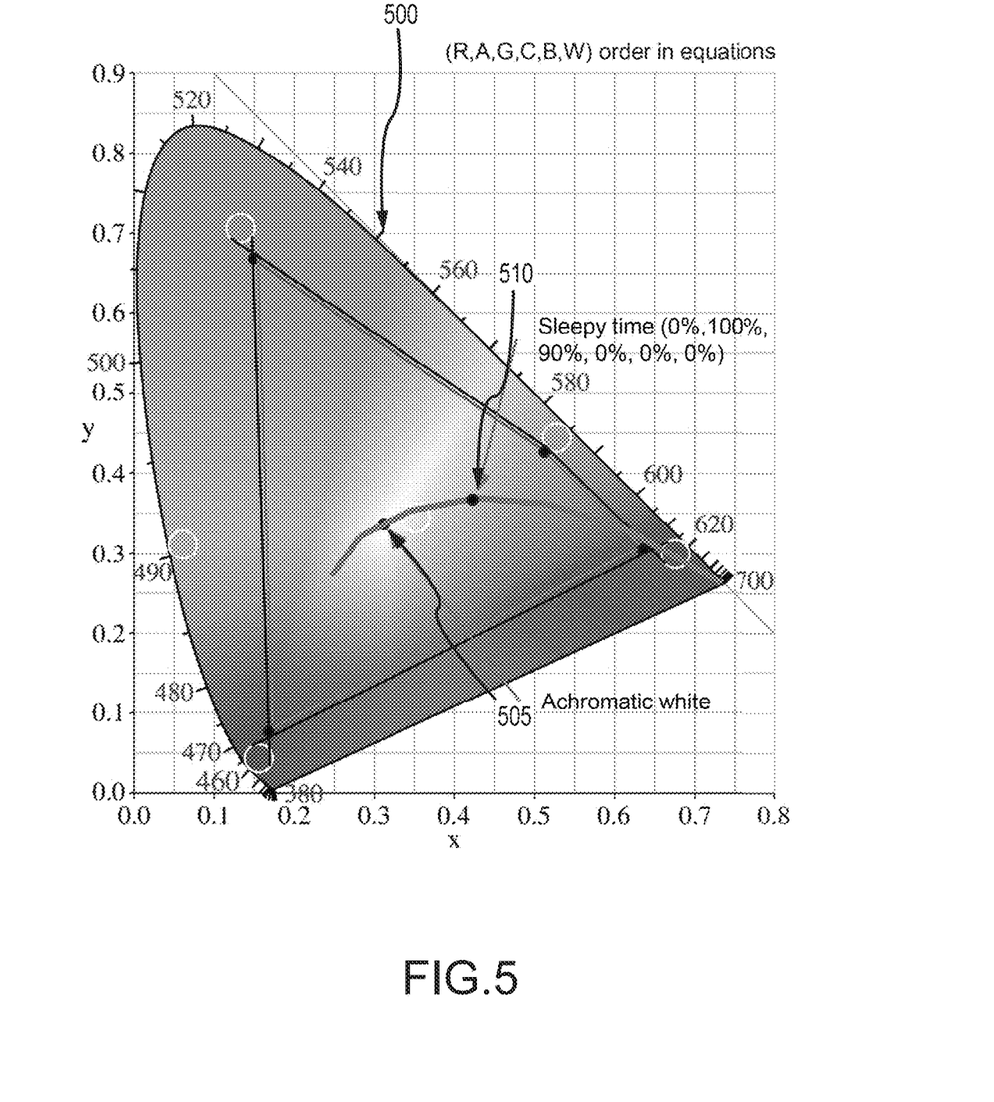
FIG. 5. illustrates a diagram of a minimum melanopic level with various white color temperatures in a color space chromaticity diagram from the International Commission on Illumination ("CIE") in accordance with various embodiments.

FIG. 5. illustrates a diagram of a minimum melanopic level with various white color temperatures in a color space chromaticity diagram from the International Commission on Illumination ("CIE") in accordance with various embodiments.

In various embodiments, the "minimum melanopic optimized spectral weighting mode" may be set by the controller 130 to commence melatonin production (i.e., to facilitate sleep), in accordance with various embodiments. A minimum melanopic optimized spectral weighting mode may minimize cyan in a mix to create white light within the color temperature domain (e.g., between 2000 K and 8000 K). In FIG. 5, in the diagram 500, the cyan color brightness is minimized, changed or reduced, or the level is sufficient to simulate a cyan color brightness with a blue/green color mix. The white color temperature is set by the controller for a color temperature of between 2000K to 8000K. The optimum color temperature range for visual brightness is between 2000K and 4000K for a chromatic white 505 because a result of a high cyan spectrum bleed over from the green/blue color mix. A high CRI/CQS results naturally at 510 while white color LED is reduced. The minimum melanopic response and the maximum melanopic response are at the end points (along 505) and the color temperature fades between the mixes that comprise a five-color mix (at 510).

Figure 6A:
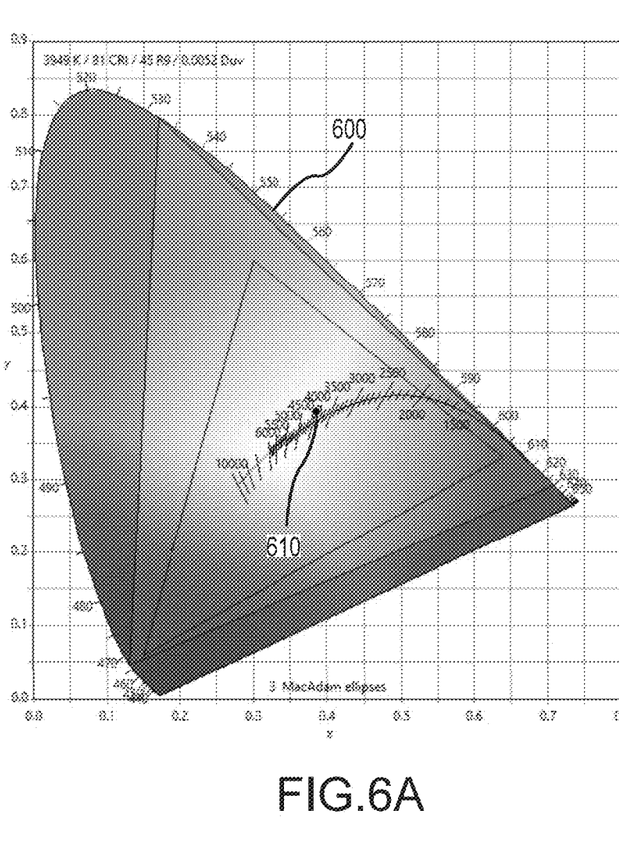
FIG. 6A illustrates a diagram of a minimum melanopic level with various white color temperatures in a color space chromaticity diagram from the International Commission on Illumination ("CIE") in accordance with various embodiments.

FIG. 6A illustrates a diagram 600 of a minimum melanopic level with various white color temperatures in a color space chromaticity diagram from the International Commission on Illumination ("CIE") in accordance with various embodiments. In the diagram 600, the same perception (i.e., metamer) of color is visually produced at approximately a temperature brightness of 4000K at 610. The melanopic ratio is set at 0.565 and the cyan energy is minimized for melatonin production. Here, if the total lumens is set to 25 (25%) then the melanopic lumens is a ratio of 14 to 1. The increases in performance at lower color temperatures are shown in the diagram 600 with this setting.

Figure 6B:
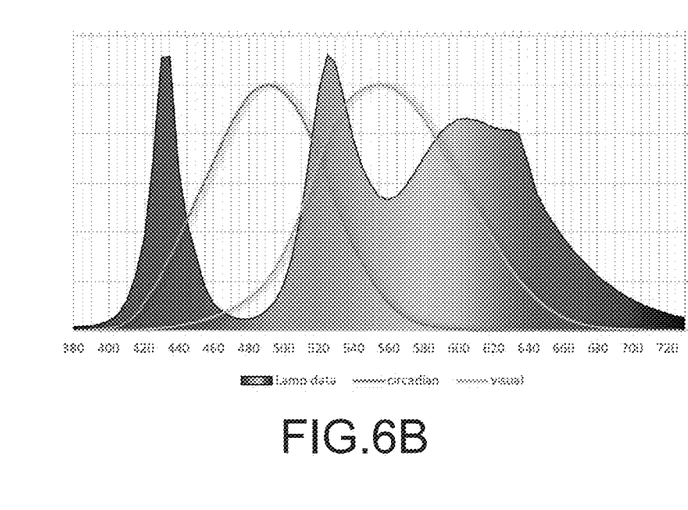
FIG. 6B illustrates a set of spectrums of comparisons for the LED, circadian and visual brightness for a minimum melanopic response in accordance with various embodiments.

FIG. 6B illustrates a set of spectrums for the LED, circadian and visual brightness for a minimum melanopic response in accordance with various embodiments. FIG. 6B shows a diagram 620 with different color temperature mixes than FIG. 4B for the minimum melanopic response.

The instructions stored on the memory of the controller 130 may be configured to perform various operations. The schematic flow charts disclosed further herein include various exemplary controller methods 700 in FIG. 7 that the processor of the controller 130 may perform. Generally, the controller 130 electrically coupled to the circuitry 120 and is configured to transition between, by the processor, various spectral weighting modes. Controlling the spectral weighting modes of the light of the LEDs 111, 112, 113, 114, 115, 116 may include blending the first electromagnetic radiation, the second electromagnetic radiation, the third electromagnetic radiation, the fourth electromagnetic radiation, the fifth electromagnetic radiation, and the sixth electromagnetic radiation in a manner to achieve a desired effect by optimizing a predetermined variable for melanopic sensitivity (e.g., hyper-gamut, CRI, brightness, lumens, etc.) within a predetermined domain (e.g., chromacity coordinates, color temperature (Kelvin), brightness (%), etc.). In various embodiments, controlling the spectral weight modes of the light of the LEDs 111, 112, 113, 114, 115, 116 may include transitioning between various spectral weighting modes based on the desired effect for the cabin 51 from FIG. 1.

Figure 7:
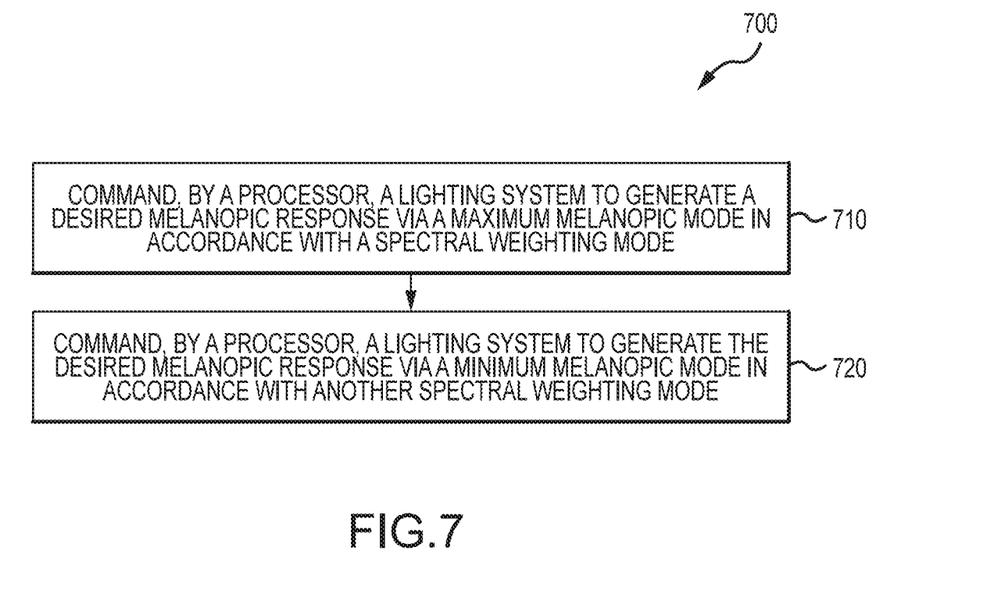
FIG. 7 is a schematic flow diagram showing a controller method, in accordance with various embodiments.

In FIG. 7, at step 710 a controller 130 configures a processor to generate a desired melanopic response in a maximum melanopic mode by a first spectral weighting mode. The spectral weighting mode is based on an algorithm that compares a part of a spectrum for an amount of melanopic lumen to a melanopic sensitivity curve to generate a result comprising a melanopic ratio. The white color temperature for the melanopic mode at the maximum amount is produced by the spectral weighting mode of a cyan color set at approximately one-hundred percent with an added color mixture comprising at least a first, second and third color. At step 720, the controller 130 configures the processor to generate a desired melanopic response in a minimum melanopic mode by a second spectral weighting mode. The cyan is minimized but can be simulated with a blue and green color temperature mix.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An article of manufacture including a tangible, non-transitory computer-readable storage medium having instructions stored thereon that, in response to execution by a processor, cause the processor to perform operations comprising:
    command, by the processor, a lighting system to generate a desired melanopic effect in accordance with a spectral weighting mode;
    determine, by the processor, the spectral weighting mode based on an algorithm that compares a part of a spectrum for an amount of melanopic lumen to a melanopic sensitivity curve to generate a result comprising a melanopic ratio; and
    in response to the result comprising the melanopic ratio, determine, by the processor, a visual brightness by multiplying the melanopic ratio with an amount of color temperature associated with the spectral weighting mode thereby inducing a desired melanopic effect,
    wherein the color temperature comprises a white color temperature, and
    wherein the white color temperature for the desired melanopic effect comprises a melanopic mode of an amount that is produced by the spectral weighting mode comprising a cyan color set at a percentage with a color temperature mixture comprising at least a set of a first color temperature, a second color temperature, and a third color temperature.

2. The article of manufacture of claim 1, wherein the color temperature is in a range between 2000 Kelvins to 8000 Kelvins.

3. The article of manufacture of claim 2, wherein the color temperature is optimized for a range between 4000 Kelvins to 6000 Kelvins.

4. The article of manufacture of claim 1, wherein the amount of the melanopic mode is a maximum amount and wherein the cyan color is set at a maximum percentage.

5. The article of manufacture of claim 4, wherein the white color temperature for the melanopic mode at the maximum amount is produced by the spectral weighting mode of the cyan color that is set at approximately one-hundred percent with an added color mixture comprising at least a first color, a second color, and a third color.

6. A lighting system, comprising:
a plurality of light emitting diodes (LEDs); and
a controller in operable communication with the plurality of LEDs, the controller configured to cause the plurality of LEDs to transition to a spectral weighting mode to:
  generate a desired melanopic effect in accordance with the spectral weighting mode;
  determine the spectral weighting mode based on an algorithm that compares a part of a spectrum for an amount of melanopic lumen to a melanopic sensitivity curve to generate a result comprising a melanopic ratio; and
  in response to the result comprising the melanopic ratio, determine a visual brightness by multiplying the melanopic ratio with an amount of color temperature associated with the spectral weighting mode thereby inducing a desired melanopic effect,
  wherein the color temperature comprises a white color temperature, and
  wherein the white color temperature for the desired melanopic effect comprises a melanopic mode of an amount that is produced by the spectral weighting mode comprising a cyan color set at a percentage with a color temperature mixture comprising at least a set of a first, a second, and a third color temperature.

7. The lighting system of claim 6, wherein the plurality of LEDs comprise at least five LEDs.

8. The lighting system of claim 6, wherein the plurality of LEDs comprise at least six LEDs.

9. The lighting system of claim 8, wherein the plurality of LEDs comprises at least one LED configured to emit electromagnetic radiation having a wavelength of between 490 nm and 510 nm to generate a cyan color.

10. The lighting system of claim 6, wherein the color temperature is in a range between 2000 Kelvins to 8000 Kelvins.

11. The lighting system of claim 10, wherein the color temperature is optimized for a range between 4000 Kelvins to 6000 Kelvins.

12. The lighting system of claim 11, wherein each LED in the plurality of LEDs is configured to emit the electromagnetic radiation of a different wavelength.

13. The lighting system of claim 12, wherein the amount of the melanopic mode is a maximum amount and wherein the percentage of the cyan color is set at a maximum percentage.

14. The lighting system of claim 13, wherein the white color temperature for the melanopic mode at the maximum amount is produced by the spectral weighting mode of the cyan color that is set at approximately one-hundred percent with an added color mixture comprising at least a first color, a second color, and a third color.

15. A light assembly for an aircraft cabin, comprising:
a controller in operable communication with a light unit, the controller configured to:
  apply a lighting condition using the light unit comprising a melanopic sensitivity in accordance with a spectral weighting mode;
  determine the spectral weighting mode based on an algorithm that compares a part of a spectrum for an amount of melanopic lumen to a melanopic sensitivity curve to generate a result comprising a melanopic ratio; and
  in response to the result comprising the melanopic ratio, determine a visual brightness by multiplying the melanopic ratio with an amount of color temperature associated with the spectral weighting mode thereby inducing a desired melanopic effect,
  wherein the color temperature comprises a white color temperature, and
  wherein the white color temperature for the desired melanopic effect comprises a melanopic mode of an amount that is produced by the spectral weighting mode comprising a cyan color set at a percentage with a color temperature mixture comprising at least a set of a first, a second, and a third color temperature.

16. The light assembly of claim 15, wherein the color temperature is in a range between 2000 Kelvins to 8000 Kelvins.

17. The light assembly of claim 16, wherein the amount of the melanopic mode is a maximum amount and wherein the cyan color is set at a maximum percentage.

18. The light assembly of claim 17, wherein the white color temperature for the melanopic mode at the maximum amount is produced by the spectral weighting mode with the cyan color that is set at approximately one-hundred percent with an added color mixture comprising at least a first color, a second color, and a third color.

* * * * *